(No Model.)

A. WAHLIN.
CENTRIFUGAL BUTTER EXTRACTOR.

No. 450,391. Patented Apr. 14, 1891.

Witnesses
Chas. H. Smith
J. Staib

Inventor
Adolph Wahlin
per Lemuel W. Serrell
atty

UNITED STATES PATENT OFFICE.

ADOLPH WAHLIN, OF STOCKHOLM, SWEDEN, ASSIGNOR TO RICHARD DUNCAN HARRIS, OF NEW YORK, N. Y.

CENTRIFUGAL BUTTER-EXTRACTOR.

SPECIFICATION forming part of Letters Patent No. 450,391, dated April 14, 1891.

Original application filed November 30, 1889, Serial No. 332,103. Divided and this application filed January 8, 1891. Serial No. 377,090. (No model.)

*To all whom it may concern:*

Be it known that I, ADOLPH WAHLIN, a subject of the King of Sweden, residing at Stockholm, Sweden, have invented an Improvement in Centrifugal Butter-Extractors, of which the following is a specification.

The object of this invention is to separate the butter direct from the sweet milk before the same has become injured by atmospheric influences, so that the buttermilk may remain in a sweet condition and the butter-cells are not broken and injured in the manner common in ordinary churns and in centrifugal separators that have heretofore been made in which the milk and cream are exposed to violent agitation.

In all centrifugal separators the most powerful effect is produced in that part of the apparatus the farthest away from the center of rotation. I avail of this in my butter-extractor and separate the cream from skim-milk in the central portion of the centrifugal extractor, and the cream is passed to the exterior of the extractor and subjected to the more powerful action thereof in gradually driving the buttermilk away from the particles of butter, and the operation is progressive toward the portion of the apparatus that is largest in diameter, at which point the buttermilk and the fat or buttery particles are discharged in a separated condition, and the apparatus is arranged in such a manner that the fresh milk can be supplied progressively and continuously, and the butter is discharged in a similar manner, and I am also able to draw off from the apparatus cream that is separated from the skim-milk, such cream being contained in a stationary vessel as it is discharged from the cream-separator and before it passes into the butter-separator.

Figure 1:
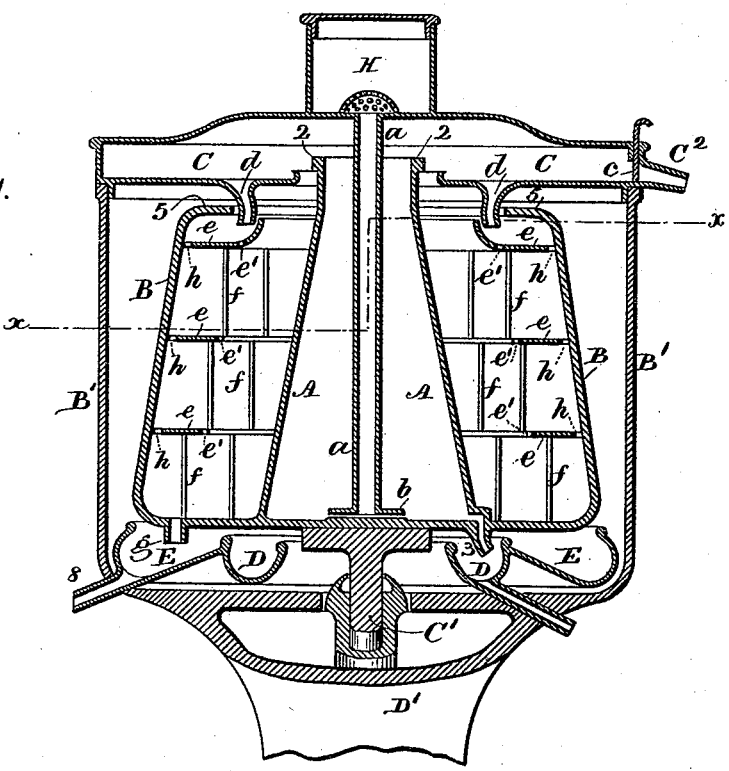
Figure 2:
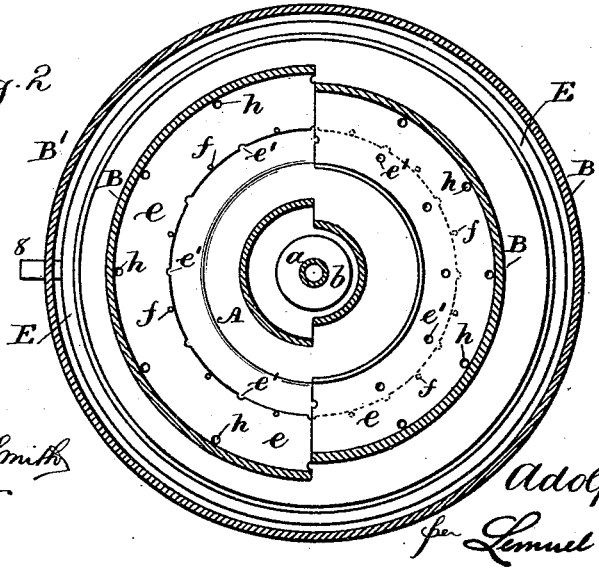

In the drawings I have represented in Figure 1 a vertical section of the apparatus, and in Fig. 2 a sectional plan at the line $x\ x$.

The vertical shaft C' is rotated by any suitable power, and is supported in the base D' in any desired or convenient manner, and the centrifugal separator is upon the upper end of the shaft and revolves with the same. The main portion B of the separator is slightly conical, and in it the butter is separated, as hereinafter named, and within the main separator B is the cream-separator A, which is conical, and there is a central supply-pipe $a$, to which the sweet or fresh milk is supplied in any suitable manner, and at the bottom end of this pipe $a$ is the spreading disk $b$, between which and the bottom of the separator the milk passes, and the cream accumulates around the inner surface of the conical separator A until it flows over and is discharged from the top edge 2 of such separator, and the skim-milk by its superior gravity and by the centrifugal action passes along the conical surface of the separator A and is discharged from the small outlet 3 into the annular receiver D, from which it runs by a suitable pipe.

The cream-holder C is stationary, and it is supported by the case B', surrounding the separator, and there is an opening in the bottom of this cream-holder, through which the upper end of the centrifugal cream-separator A passes, in order that the cream thrown off by the centrifugal force may be received into this cream-holder C, and there is a spout $C^2$ and a valve or gate at $c$ to regulate the discharge of the cream from the holder. Hence more or less of the cream that is separated by the centrifugal separator A can be drawn off, or the whole of it may be used in making butter, as hereinafter described.

I have shown upon the top of the cream-holder C a milk-holder H, through the bottom of which the pipe $a$ opens, and there is a perforated cover to the pipe $a$. The fresh milk is supplied into the holder H in the usual manner and passes down through such pipe $a$ into the cream-separator A, and from the cream-holder C the cream passes down by gravity through the tubes $d$ into the butter-separator B. As before mentioned, this butter-separator B is conical, and its upper end is contracted by a conical flange 5, so as to retain the cream as it passes down through the tubes $d$, and within the butter-separator B are annular shelves $e$, there being any desired number of such shelves. I have shown three of them, and each shelf has one or more openings $h$ adjacent to the interior surface of the conical separator, and also by preference one or more holes $e'$ or notches at or near the inner edge of each shelf, and there is at the bottom of the butter-separator an escape or delivery tube $g$, from which the butter and the buttermilk pass gradually and are thrown off into the annular receiver E, which is around the base of the butter-separator, and is preferably constructed so that the particles of butter can be easily removed therefrom, the buttermilk running away by an opening or spout 8. It will now be apparent that the particles of butter, being the lightest, will be displaced by the buttermilk, the latter passing outwardly and intervening between the particles of butter and the interior of the conical sides of the separator B, and the openings $h$ are of a size to cause the proper proportional delivery of the buttermilk through the respective shelves from one section to the next, and as the particles of butter pass from one shelf to the other the centrifugal force causes the buttermilk to pass outwardly away from the particles of butter, so that the buttermilk intervening between the metal and the buttery particles prevents the latter adhering, and such buttery particles aggregate or adhere together more or less and pass away, and the buttermilk runs from the particles of butter as the two are discharged through the opening $g$. If there are openings at $e'$, the buttery particles will pass through the same, or if there are notches at the edges of the shelves the buttery particles will flow through them as such particles accumulate. Otherwise these particles will flow over the inner edges of the shelves as they pass from one section of the butter-separator to the other.

With centrifugal separators the vessel itself moves somewhat faster than the liquid or semi-liquid contents thereof. I make use of this condition to effect a slight stirring operation in the cream to aid in opening up the mass for the particles of buttermilk to be driven outwardly and away from the buttery particles by the centrifugal action. This object is accomplished by the ranges of wires $f$, that are parallel, or nearly so, to the axis of rotation of the separator and lie within the respective layers of buttery particles in line, or nearly so, with the delivery holes or edges, so as to produce an agitation in the layer of buttery particles.

Instead of continuous wires from one shelf to the next, such wires may be in the form of studs or pins or teeth of greater or less length.

In cases where the holes $h$ are closed or not provided the buttermilk will accumulate in the annular spaces until it flows over the edges of the shelves. The buttery particles will be upon the surface of such buttermilk and pass along progressively to the place of delivery.

It will be understood that the buttermilk remains sweet and is in a better condition for use than it is after the ordinary souring operation incident to the usual manner of making butter, and by the present improvements a saving of time is effected in the separation of the butter and in the room and number of vessels required in the dairy, as it is not necessary to make use of cream-vats, churns, or coolers, and considerable saving is effected in the running expenses connected with the production of the butter by the separation of the butter mechanically from the sweet milk and by comparatively unskilled attendants, and the dairy business is rendered more reliable and less dependent upon skilled labor, and the different products from the milk—such as skim-milk, buttermilk, and butter—are preserved in the best condition for subsequent use, because the cream is not exposed to any whipping action, violent agitation, or unnecessary exposure to the oxidizing influences of the atmosphere.

In centrifugal butter-extractors heretofore made use of the violent agitation to which the cream is exposed tends to mix the buttery particles with the buttermilk similar to the production of an emulsion. This is entirely prevented by my improvements, and any buttermilk remaining in the butter after it is taken from the trough E can be easily removed by an ordinary butter-worker.

In consequence of the cream and buttery particles passing along over a series of annular ledges or shelves and proceeding from a smaller diameter to a larger diameter the cream and buttery particles are exposed to two peculiar actions. The cream and buttery particles form annular rings of successively-increasing diameter, and during the separating operation the respective rings are exposed to the severe centrifugal action that tends to cause the buttery particles to adhere to each other, and at the same time the skim-milk, being heavier, is thrown outwardly between respective ledges or shelves, and as the cream is added at one end of the butter-separator the accumulation is sufficient to force a portion of the buttery particles over the edge of one shelf or ledge into the next one, and in so doing there is more adhesion between the ledge or shelf, and the buttery particles than there is between the skim-milk and such ledge or shelf and the skim-milk is thrown outwardly by the centrifugal action, and the buttery particles are delivered upon the surfaces of the next annular ring of buttery particles, and this operation continues as the materials are crowded over one edge or ledge into the next receptacle, and the granules or lumps of butter increase in size, so that when they are delivered from the centrifugal apparatus they can easily be collected within a sieve and separated from the skim-milk and only require to be treated in the usual manner by a butter-worker.

The present is a division of my application filed November 30, 1889, Serial No. 332,103, and I do not herein claim the combination, with a centrifugal cream-separator, of the butter-separator connected to and revolving with the cream-separator and having a series of annular shelves or ledges for retaining the cream, whereby as the buttery particles are forced to pass over the edges of the shelves or ledges they are caused to adhere together, nor a centrifugal butter-separator having a series of annular ledges or shelves increasing in diameter from the supply end of the separator and a delivery opening or openings at the larger end of the separator for the discharge of the buttery particles and skim-milk, the buttery particles being caused to adhere together as they are forced by the centrifugal action to pass over the edges of the annular shelves in succession.

I claim as my invention—

1. The combination, in a centrifugal separator, of an inner cream-separating vessel, means for supplying milk to the same, a stationary vessel for the reception of the cream from the cream-separator, a delivery-tube therefrom, and an outer centrifugal butter-separator into which the cream is returned from the stationary receptacle, substantially as set forth.

2. The conical centrifugal butter-separator having a series of annular ledges of successively-increasing diameters, against which the materials accumulate for the buttery particles to pass over the edges of the ledges successively, there being small holes through the ledges adjacent to the interior of the conical separator for the passage of the skim-milk or watery substances, substantially as specified.

3. The centrifugal cream-separator A, and the butter-separator B, surrounding the same, and means for revolving the said separators, in combination with a stationary cream-holder into which the end of the centrifugal cream-separator passes, a spout through which cream can be discharged from the holder, a tube for the passage of the cream into the butter-separator, and a pipe for gradually supplying the milk to the cream-separator, substantially as set forth.

4. The centrifugal butter-separator having annular shelves and of larger diameter at the delivery end than at the supply end, in combination with the agitators connected with the shelves and serving to slightly agitate or open out the buttery particles, substantially as set forth.

5. The combination, in a centrifugal separator, with the supply-pipe for the milk, of two conical vessels, one within the other and rotating together, and a stationary receptacle for the cream, the skim-milk being discharged from the larger end of the inner vessel and the cream from the smaller end of such vessel into the stationary receiver, there being a pipe or opening from the stationary receiver, through which the cream passes to the smaller end of the outer vessel, and a pipe or discharge-opening for the butter at the larger end of the outer centrifugal separator, substantially as set forth.

6. The centrifugal butter-separator having a series of annular ledges of successively-increasing diameters, against which the materials accumulate, and notches in the edges where the buttery particles pass over the edges of the ledges successively, substantially as specified.

7. The conical centrifugal butter-separator having a series of annular ledges of successively-increasing diameters, against which the materials accumulate, and notches in the edges where the buttery particles pass over the edges of the ledges successively, there being small holes through the ledges adjacent to the interior of the conical separator for the passage of the skim-milk or watery substances, substantially as specified.

Signed by me this this 7th day of January, 1891.

ADOLPH WAHLIN.

Witnesses:
GEO. T. PINCKNEY,
CHAS. H. SMITH.